United States Patent Office 3,137,708
Patented June 16, 1964

3,137,708
ACTINOSPECTINOIC ACID AND PROCESS FOR PREPARING
Paul F. Wiley, Texas Township, Kalamazoo County, Mich., assignor to The Upjohn Company, Kalamazoo, Mich., a corporation of Delaware
No Drawing. Filed Jan. 22, 1962, Ser. No. 167,913
9 Claims. (Cl. 260—347.3)

This invention relates to novel compositions of matter and to a process for the preparation thereof, and is particularly directed to the novel compound actinospectinoic acid and to a process for producing the same.

Actinospectacin is a biosynthetic product produced by the controlled fermentation of *Streptomyces spectabilis*. Various methods for the production, recovery, and purification of actinospectacin are described in the published literature, e.g., D. J. Mason et al., Antibiotics and Chemotherapy, 11, p. 118, 1961; M. E. Bergy et al., Antibiotics and Chemotherapy, 11, p. 661, 1961, Union of South Africa Patent No. 60/4098 and Belgian Patent No. 596,175. Actinospectacin is characterized by an optical rotation $[\alpha]_D^{25} = -20°$ ($H_2O$); by solubility in water, methanol, and ethanol, and by insolubility in acetone and hydrocarbon solvents; and by the presence of two basic groups: $pKa_1$ 6.95 ($H_2O$), $pKa_2$ 8.70 ($H_2O$). It was formerly thought that the molecular formula was

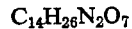

but it has since been shown that the formula is

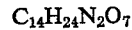

It has now been found that a novel compound according to this invention is obtained by acting upon actinospectacin with an alkaline material. By this procedure, the actinospectacin molecule is cleaved, yielding a new compound, tetrahydro-3-hydroxy-5-methyl-2-[2,4,6-trihydroxy-3,5-bis(methylamino)cyclohexyloxy]-3-furoic acid, which has been given the trivial name of actinospectinoic acid. Novel compounds according to this invention are also obtained by acylating actinospectinoic acid. On acylation, actinospectinoic acid is converted to a diacyl derivative in which the acyl groups are attached to the nitrogen atoms and a triacyl- and tetraacyl derivative in which the third and fourth acyl groups are attached to different oxygen atoms. Subsequent to this invention, the structure of actinospectacin has been elucidated. The novel compounds of the invention therefore can now be represented by the following formula:

(II)

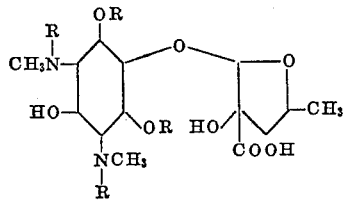

wherein R is selected from the class consisting of hydrogen and hydrocarbon carboxylic acid acyl of from two to twelve carbon atoms, inclusive; halo-, nitro-, hydroxy-, amino-, cyano-, thiocyano-, and lower alkoxy-substituted hydrocarbon carboxylic acid acyl of from two to twelve carbon atoms, inclusive; and lower alkoxycarbonyl.

The term "hydrocarbon carboxylic acid acyl of from two to twelve carbon atoms" whenever used in the specification or claims is intended to mean an acyl corresponding to a hydrocarbon carboxylic acid of from two to twelve carbon atoms, inclusive. Suitably such acids include (a) a saturated or unsaturated, straight or branched chain aliphatic carboxylic acid, for example, acetic, propionic, butyric, isobuytric, tert-butylacetic, valeric, isovaleric, caproic, caprylic, decanoic, dodecanoic, acrylic, crotonic, hexynoic, heptynoic, octynoic acids, and the like; (b) a saturated or unsaturated alicyclic carboxylic acid, for example, cyclobutanecarboxylic acid, cyclopentanecarboxylic acid, cyclopentenecarboxylic acid, methylcyclopentenecarboxylic acid, cyclohexanecarboxylic acid, dimethylcyclohexenecarboxylic acid, dipropylcyclohexanecarboxylic acid, and the like; (c) a saturated or unsaturated substituted alicyclic aliphatic carboxylic acid, for example, cyclopentaneacetic acid, cyclopentanepropionic acid, cyclopenteneacetic acid, cyclohexanebutyric acid, methylcyclohexaneacetic acid, and the like; (d) an aromatic carboxylic acid, for example, benzoic acid, toluic acid, naphthoic acid, ethylbenzoic acid, isobutylbenzoic acid, methylbutylbenzoic acid, and the like; and (e) an aromatic-aliphatic carboxylic acid, for example, phenylacetic acid, phenylpropionic acid, phenylvaleric acid, cinnamic acid, phenylpropiolic acid, naphthylacetic acid, and the like.

The term "halogen-, nitro-, hydroxy-, amino-, cyano-, thiocyano-, and lower-alkoxy-substituted hydrocarbon carboxylic acid acyl of from two to twelve carbon atoms, inclusive" is intended to mean hydrocarbon carboxylic acid acyl as hereinbefore defined which are substituted by one or more halogen atoms, nitro, hydroxy, amino, cyano, thiocyano, or lower-alkoxy groups. By "lower-alkoxy" is meant an alkoxy group of from one to six carbon atoms, inclusive, for example, methoxy, ethoxy, propoxy, butoxy, pentyloxy, hexyloxy, and isomeric forms thereof. Examples of substituted hydrocarbon carboxylic acid acyl falling within the above definition are the acyl corresponding to chloroacetic acid, chloropropionic acid, bromobutyric acid, iodovaleric acid, chlorocyclohexanecarboxylic acid, o-, m-, and p-chlorobenzoic acid, anisic acid, salicylic acid, p-hydroxybenzoic acid, o-, m-, and p-nitrobenzoic acid, cyanoacetic acid, thiocyanoacetic acid, cyanopropionic acid, lactic acid, glycine, ethoxyformic, and the like.

Actinospectinoic acid, according to the invention, is obtained by alkaline treatment of actinospectacin. Hydrolysis of the starting material is effected by contact thereof with an alkaline material, e.g., an alkali metal hydroxide, for example, sodium hydroxide, potassium hydroxide, lithium hydroxide, and the like, an alkaline earth metal hydroxide, for example, calcium hydroxide, barium hydroxide, an alkali metal carbonate, for example, sodium carbonate, potassium carbonate, and the like. Conversion to actinospectinoic acid is also effected when actinospectacin is brought into contact with or passed over a strongly basic anion exchange resin. [Suitable anion exchange resins for this purpose are obtained by chloromethylating by the procedure given on pages 88 and 97 of Kunin, Ion Exchange Resins, 2nd Ed. (1958), John Wiley and Sons, Inc., polystyrene crosslinked, if desired, with divinylbenzene prepared by the procedure given on page 84 of Kunin, supra, and quaternizing with trimethylamine, or dimethylalkanolamine by the procedure given on page 97 of Kunin, supra. Anion exchange resins of this type are marketed under the trade names Dowex 2, Dowex 20, Amberlite IRA-400, Duolite A-102, and Permutit S-1.] The desired product is isolated from the reaction medium and is utilized as the free acid or derivatives prepared therefrom.

It has also been found that a novel compound is formed when actinospectinoic acid is acted upon by an acidic material, e.g., a strong mineral acid, for example, hydrogen chloride, hydrogen bromide, hydrogen iodide, sulfuric acid, phosphoric acid, and the like. Upon acidic hydrolysis, the actinospectinoic acid molecule is cleaved to yield a new compound 1,3-deoxy-1,3-bis(methylamino)myoinositol which has been named actinamine.

The invention embodies the formation of various basic and acid addition salts, for example, those obtained when actinospectinoic acid is reacted with an alkali metal hydroxide, an alkaline earth metal hydroxide (including magnesium), ammonia, and an amine, for example, mono-, di-, and trimethylamine; also those obtained when actinospectinoic acid is reacted with acids, for example, hydrochloric, sulfuric, phosphoric, acetic, succinic, citric, oxalic, lactic, maleic, and fumaric, methanesulfonic, benzenesulfonic, helianthic, Reinecke's, azobenzenesulfonic, picric, and like acids.

Actinospectacin is hydrolyzed at a pH between 11.0 and about 13.0 and preferably at about 12.0. The reaction is usually conducted between about 15° and about 30° C. although higher temperatures can be used successfully.

Actinospectinoic acid can be recovered from the reaction medium by a variety of procedures, for example, after hydrolysis with barium hydroxide, the reaction medium is adjusted to a pH between about 8 and about 9 with sulfuric acid, and the resulting mixture is centrifuged to remove the insoluble salt. The solution is then evaporated to dryness under reduced pressure after which crystallization is accomplished from a mixture of water and a water-miscible ketone. When hydrolysis is effected by use of an ion exchange resin procedure, the resin is washed with ammonia and the filtrate neutralized with an appropriate mineral acid, for example, hydrochloric acid, phosphoric acid, sulfuric acid and the like, after which crystallization is accomplished from a mixture of water and a water-miscible ketone.

The N,N'-diacyl, N,N'-O-triacyl, and N,N',O,O'-tetraacyl derivatives of actinospectinoic acid are obtained by acylating actinospectinoic acid with an appropriate acid anhydride or chloride. For example, on reacting actinospectinoic acid with acetic anhydride in the presence of pyridine, N,N'-diacetyl-, N,N'-O-triacetyl-, and N,N',O,O'-tetraacetylactinospectinoic acid are obtained. The degree of acylation of the actinospectinoic acid molecule is determined by the amount of acylating agent used. Accordingly, two moles of acylating agent will yield the N,N'-diacylactinospectinoic acid. Mixed acylates can be obtained by acylating the N,N'-diacyl-, and N,N',O-triacylactinospectinoic acid with a different acylating agent. For example, on reacting N,N'-diacetylactinospectinoic acid with sodium propionate and propionic anhydride, succinic anhydride, maleic anhydride, phthalic anhydride, and the like, the corresponding mixed acylate is obtained.

Novel compounds of this invention are also obtained by acting upon actinospectinoic acid with a lower alkoxy haloformate (lower alkyl halocarbonate) to obtain the corresponding polyalkoxycarbonylactinospectinoic acid. For example, on reacting actinospectinoic acid with ethyl chloroformate (2 moles) (ethyl chlorocarbonate) in the presence of pyridine there is obtained N,N'-diethoxycarbonylactinospectinoic acid. When a greater amount of ethyl chloroformate is used there are obtained N,N',O-triethoxycarbonyl-, and N,N',O,O'-tetraethoxycarbonylactinospectinoic acid. Mixed acylates can be obtained by acylating the N,N'-diethoxycarbonyl-, and N,N',O-triethoxycarbonylactinospectinoic acid with a different acylating agent.

The novel compound of the invention, actinospectinoic acid, is useful in accordance with U.S. Patents 1,915,334 and 2,075,359, in preparing amine fluosilicate mothproofing agents, and, in accordance with U.S. Patents 2,425,320 and 2,606,155, in preparing amine thiocyanate-formaldehyde condensation products for use as pickling inhibitors. It can also be used as an intermediate. The carboxyl group can be esterified in accordance with U.S. Patent 2,220,521 to form beta-thiocyanoethyl esters useful for the purposes, especially as insecticides, described in this patent. The carboxyl group can also be esterified with lower diazoalkanes, e.g., diazomethane and diazoethane, to produce the lower alkyl esters of actinospectinoic acid. (The term "lower alkyl" whenever used in the specification or claims refers to alkyl of one to eight carbon atoms, inclusive, e.g., methyl, ethyl, propyl, butyl, amyl, hexyl, heptyl, octyl, and the isomeric forms thereof.) The esters can be utilized to purify the acids; thus by esterifying a crude acid, isolating the ester, and hydrolyzing it, the acid is upgraded.

The following examples are illustrative of the process and products of the present invention, but are not to be construed as limiting.

EXAMPLE 1

*Actinospectinoic Acid*

A solution of 5.0 g. of actinospectacin in 250 ml. of 0.1 N barium hydroxide solution was allowed to stand at room temperature for 24 hrs. The pH was adjusted to 9.0 with 2.0 N sulfuric acid, and the barium sulfate was removed by centrifugation. The remaining barium ion was removed by addition of sulfuric acid, and the resulting precipitate was removed by filtration through a filter aid. The remaining filtrate was evaporated to dryness under reduced pressure. The residue was then dissolved in 15 ml. of water, and 250 ml. of acetone was added. Refrigeration of this solution gave 4.52 g. of actinospectinoic acid crystals which had a melting point of 233 to 238° C. Two crystallizations from water-acetone gave a melting point of 230 to 235° C. The crystalline actinospectinoic acid had pKa' values of 3.3, 7.37, and 9.33; an optical rotation $[\alpha]_D^{25}$ —89° (c, 1.0% in $H_2O$); and characteristic infrared absorption at the following wavelengths expressed in reciprocal centimeters:

| | |
|---|---|
| 3440 (S) | 1485 (S) |
| 3340 (S) | 1160 (S) |
| 3150 (S) | 1125 (S) |
| 2700 (S) | 1080 (S) |
| 2540 (S) | 1070 (S) |
| 1715 (W) | 1055 (S) |
| 1635 (S) | 1030 (S) |
| 1595 (S) | |

Elemental analysis: Calculated for $C_{14}H_{26}N_2O_8$: C, 48.00; H, 7.43; N, 8.0; O, 36.55; molecular weight: 350. Found: C, 47.73; H, 7.35; N, 8.17; O, 37.23; molecular weight: (elect. titr.) 369.

I claim:

1. A compound selected from the group consisting of actinospectinoic acid having the formula:

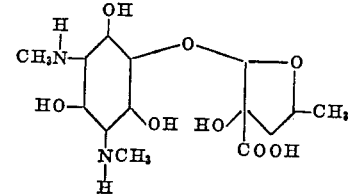

(I)

and its lower alkanoyl and lower alkoxycarbonyl acylates.

2. Actinospectinoic acid.

3. A process for making actinospectinoic acid which comprises subjecting actinospectacin to alkaline hydrolysis at a pH of about 11 to about 13.

4. A process for making actinospectinoic acid which comprises subjecting actinospectacin to alkaline hydrolysis with barium hydroxide solution at a pH of about 11 to about 13.

5. A compound of the formula:

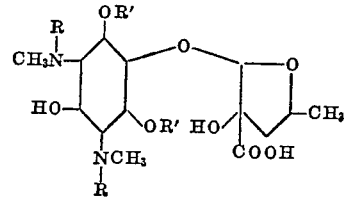

(II)

wherein R is alkanoyl of from 2 to 12 carbon atoms, inclusive; and wherein R' is selected from the class consisting of hydrogen and alkanoyl of from 2 to 12 carbon atoms, inclusive.

6. N,N'-di-lower alkanoylactinospectinoic acid.
7. N,N',O,O'-tetra-lower alkanoylactinospectinoic acid.
8. The mono-o-lower-alkanoic acid acylates of the compound of claim 6.
9. A compound selected from the group consisting of alkaline earth and alkali metal salts of actinospectinoic acid.

References Cited in the file of this patent

Fieser: Organic Chemistry (1956), pages 181–2, QD 251 F5.